United States Patent [19]
Braukman

[11] 3,799,450
[45] Mar. 26, 1974

[54] AERATOR FOR HOSE TYPE IRRIGATION SYSTEM

[76] Inventor: Clarence A. Braukman, 7570 W. Amherst, Denver, Colo. 80227

[22] Filed: Nov. 24, 1972

[21] Appl. No.: 309,434

[52] U.S. Cl. .......................... 239/428.5, 239/430
[51] Int. Cl. .............................................. B05b 7/30
[58] Field of Search .......... 239/419.5, 427.3, 428.5, 239/429, 430

[56] References Cited
UNITED STATES PATENTS

| | | | |
|---|---|---|---|
| 3,567,116 | 3/1971 | Lindlof | 239/2 S |
| 174,781 | 3/1876 | Clemens | 239/428.5 X |
| 2,392,408 | 1/1946 | Radonich | 239/431 X |
| 2,120,620 | 6/1938 | Mowery | 239/428.5 |
| 2,724,583 | 11/1955 | Targosh et al. | 239/428.5 X |
| 3,084,875 | 4/1963 | Klingler | 239/429 X |
| 3,705,690 | 12/1972 | Brown | 239/430 X |

Primary Examiner—M. Henson Wood, Jr.
Assistant Examiner—Michael Y. Mar
Attorney, Agent, or Firm—Burton, Crandell & Polumbus; Ralph F. Crandell

[57] ABSTRACT

An aerator fitting adapted to be mounted between a pressurized water outlet such as a sillcock or hose cock, and an irrigation conduit such as a hose. The fitting is formed as a sleeve-shaped body having a central passageway therethrough and threaded at each end for engagement with the water outlet and irrigation conduit. The sleeve includes a central passageway into which tapered air jet inlet passages extend from the exterior of the sleeve. When water under pressure flows through the sleeve, jets of air are drawn through the air jet passages and squirt into the water to aerate the same, the air introduced thereby being dissolved and entrapped in said water as said aerated water flows through the irrigation conduit to the outlet thereof.

3 Claims, 6 Drawing Figures

PATENTED MAR 26 1974
3,799,450
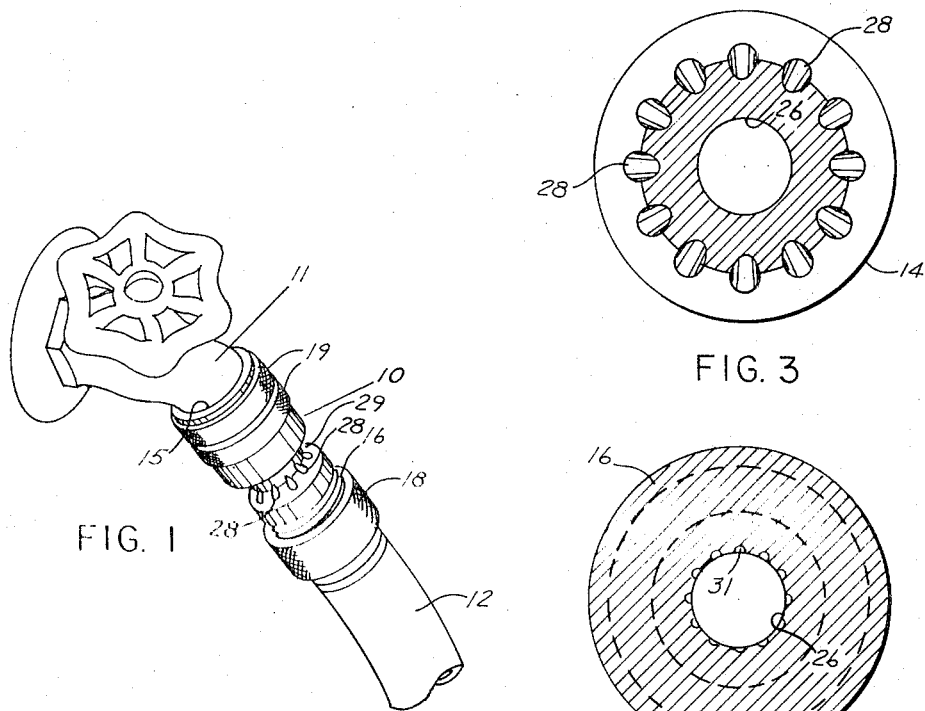
FIG. 1
FIG. 3
FIG. 4
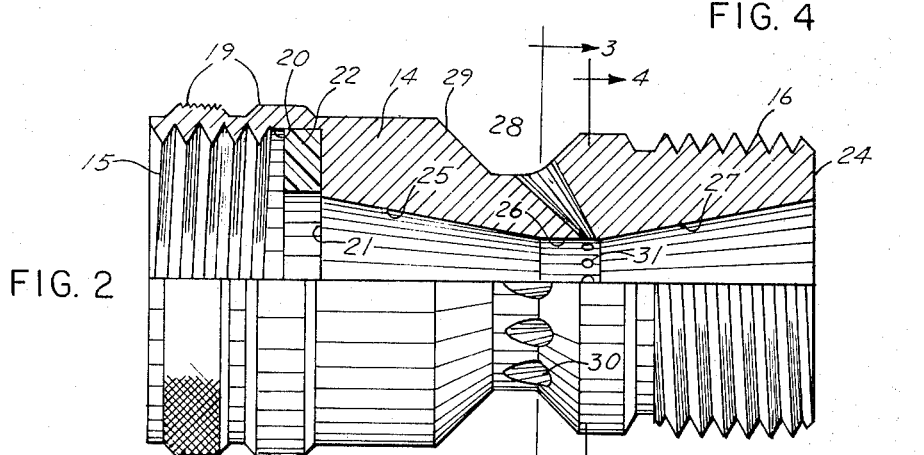
FIG. 2
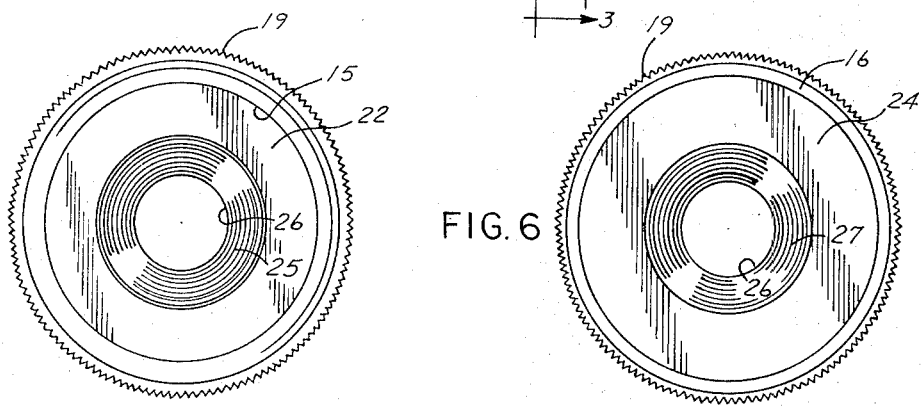
FIG. 5
FIG. 6

AERATOR FOR HOSE TYPE IRRIGATION SYSTEM

BACKGROUND OF THE INVENTION

1. Field Of The Invention

The present invention relates to aerating devices for use in connection with irrigation systems of the hose type intended principally for use in lawn and garden applications. More particularly, the invention relates to an aerator device for aerating water from a sillcock to be applied through a hose to lawn and garden areas.

2. Description Of The Prior Art

It is known in the art that aerated water, such as rain water, has a particularly valuable effect upon growing plants. It is biologically known that such desirable effects are achieved as a result of the gases which are dissolved or retained in the water. As rain water falls through the atmosphere, the small droplets pick up substantial amounts of air, the major contents of which are oxygen and nitrogen. As these droplets fall on lawns and gardens, and the water is absorbed into the ground, it carries the nitrogen, oxygen and other atmospheric gases into the ground where it may be utilized by the roots of growing plants and earth animals and organisms. It has been further observed that where water sits for a period of time, the gases dissolved therein escape, much in the manner that carbon dioxide escapes from carbonated water. Hence, such water has a lesser nitrogen value than does rain water. It has been observed that growing plants exhibit substantially increased growth with rain water as compared to tap water or water which has been allowed to stand in a reservoir or remains in a pipe for a period of time.

I have long observed, and believe that my opinion is shared by farmers and agricultural experts, that a given amount of natural rain produces a far greater beneficial effect on growing crops than when the same amount of water is applied to them by irrigation from reservoir fed ditches or reservoir fed city water supplies. Plants need the gases that are present in the atmospheric air, particularly nitrogen and oxygen. Air is a mixture of gases containing principally nitrogen and oxygen. When a rain drop starts falling, it soon assumes a streamlined form, and at terminal velocity its nose is flattened out from the pressure of the air through which it is rushing. This pressure forces tiny bits of air to enter the drop of water and be held in it. When the drop smashes into cultivated ground it is quickly absorbed and its contained air with its substantial oxygen and nitrogen portion. In combination with soil chemicals and soil bacteria, it is placed right where it will feed the plant. Plants like this and thrive on it, grow and mature better and quicker.

Various suggestions have been made for aerating water to be applied to lawn and gardens. In U. S. Pat. No. 2,564,060 issued Aug. 14, 1951 to Edwin G. Gettins for "Aeration Sprinkler" the inventor suggests that irrigation water may be aerated at a sprinkler head in order to introduce fresh atmospheric air into the spray. It is noted that the aeration with this type of sprinkler produces mainly bubbles of air in the water spray and the water has little chance to absorb atmospheric nitrogen, oxygen and other gases normally present in air. Other aerating sprinkler heads have also been suggested for introducing air into water at a nozzle. See, for example, U. S. Pat. No. 2,477,204 issued July 26, 1949 to M. D. Ravine for "Soil Aerator"; U. S. Pat. No. 2,515,600, issued July 18, 1950 to S. A. Hayes, for "Irrigator Head"; U. S. Pat. No. 2,941,729, issued June 21, 1960 to J. J. Goodrie, for "Hose Nozzle with Aerator"; U. S. Pat. No. 3,034,733, issued May 15, 1962 to R. G. Brooks et al. for "Irrigator"; and U. S. Pat. No. 3,058,670 issued Oct. 16, 1962 to R. A. Marotto et al., for "Nozzle and Irrigator Attachment." It should be noted that in each of the above-identified patents the aerating structure is such as to introduce air directly at the water outlet nozzle so that the water has little, if any, chance to absorb atmospheric nitrogen and carry the nitrogen into the soil being irrigated.

Reference will be made in this specification to a venturi and venturi-effect. The operation of a venturi is based on the principle that if a constriction is placed in a closed channel or conduit carrying a stream of fluid, there will be an increase in velocity, and hence an increase in kinetic energy, at the point of constriction. From an energy balance, there must be a corresponding reduction in pressure at the point of constriction. If this reduction is below atmospheric pressure, a suction will be created at the point of the constriction.

OBJECTS OF THE INVENTION

The principal object of the present invention is to provide an improved aerating device for use in hose type garden and lawn irrigation systems for improving the aeration of irrigation water and for increasing the amount of air absorbed by the water and carried thereby into the ground being irrigated.

Another object of the present invention is to provide an aerating device adapted to be affixed to a sillcock and further adapted to receive a hose, for the purpose of aerating irrigating water carried by the hose.

A further object of the invention is to provide an improved aerating device of the above characteristics which is simple and of one piece construction, inexpensive, rugged, nonclogging, efficient and simple to use.

Other objects and advantages of the present invention will become apparent from the following description and accompanying drawings.

SUMMARY OF THE INVENTION

In accordance with the foregoing objects, the present invention comprises an aerating fitting in the form of a unitary or one piece sleeve fitting member having an internally threaded portion adapted to be threadably engaged with a water tap such as a sillcock, or a pipe, and an opposite externally threaded end adapted for mounting an irrigating hose or conduit. Intermediate the threaded ends the body of the sleeve member includes an internal bore tapering inwardly from each end of the fitting to a restricted central bore, with a plurality of conical generally radially disposed air inlet ports directed into the restricted area of the sleeve for introducing jets of air into water flowing through the aerator sleeve. The air inlet ports are tapered from a relatively wide inlet to a relatively narrow outlet in the restricted area of the fitting in order to speedup the air flow into the throat. In this manner the air flow is speededup by the tapered port so as to provide a jetlike or squirting action into the flowing water stream, which enhances the mixing of the air and water, thereby increasing the area of contact between the air and water. As the aerated water flows through the irrigating conduit, it has a chance to absorb nitrogen, oxygen and other gases from the atmosphere introduced into the water stream by the aerating fitting. When the irrigating water is applied to a lawn, garden or the like, the water soaks into the ground and carries with it the dissolved or entrained nitrogen and other beneficial gases from the atmospheric air. Growth of plants, grass, etc. is thereby substantially increased and enhanced.

DESCRIPTION OF THE DRAWINGS

FIG. 1 is an isometric view of an aerating fitting embodying the present invention mounted on a sillcock and valve and connected to an irrigating hose.

FIG. 2 is an enlarged elevation view, in half section, of an aerating fitting embodying the present invention as shown in FIG. 1.

FIG. 3 is a section view taken substantially in the plane of line 3—3 on FIG. 2.

FIG. 4 is a section view taken substantially in the plane of line 4—4 on FIG. 2.

FIG. 5 is an end view showing the internally threaded end of the fitting shown in FIG. 2.

FIG. 6 is an end view showing the externally threaded of the fitting shown in FIG. 2.

DESCRIPTION OF THE PREFERRED EMBODIMENT

An aerator fitting embodying the present invention is shown in the drawings and reference is made in particular to FIGS. 1 and 2. The aerator fitting indicated generally at 10 is adapted to be threadably engaged with a pipe end, hosecock, or sillcock 11, as a source of pressurized irrigation water, and supports a flexible irrigating hose 12, all as shown in FIG. 1. The fitting itself is shown in detail in FIG. 2 and is formed as a generally sleeve-shaped body member or sleeve 14 having an internally threaded bore 15 at one end adapted to be threadably engaged with external threads on the faucet of sillcock 11. At its opposite end the sleeve 14 is provided with external threads 16 to which is secured an internally threaded sleeve 18 forming a part of the hose or conduit 12. For enabling the user to grip the fitting and secure it tightly to a sillcock, the external surface of the sleeve 14 adjacent the internal threaded portion 15 is provided with knurls 19.

In order to seal the fitting 10 on the sillcock 11 as it is threadably engaged therewith, the sleeve 14 is provided with an internal counterbore 20 adjacent the threads 15 and a radial annular shoulder 21 against which a conventional flexible washer 22 is seated. As the threads 15 of the fitting sleeve 14 are engaged on the sillcock, the end of the sillcock faucet engages and seals against the washer 22. At its opposite end, the sleeve 14 defines an annular shoulder 24 which is adapted to correspondingly seat against a like washer (not shown) in the hose sleeve 18.

In order to provide a substantial jet-like aerating effect for purposes of introducing substantial amounts of atmospheric air into a stream of water flowing from the sillcock 11 through the fitting 10 into the hose 12, the fitting sleeve 14 is defined with an internal bore or passageway which provides a venturi effect. As shown in FIG. 2, the sleeve 14 is provided at the portion thereof adjacent the inlet end as defined by the internal threads 15 with an internal tapering inlet bore 25 tapering from a relatively large diameter adjacent the shoulder 21 to a relatively narrower diameter adjacent an internal intermediate venturi bore 26. The central bore 26 is of a relatively short axial length and leads into an outwardly tapering outlet bore 27 internally of the portion of the sleeve 14 defined by the external threads 16. The outwardly tapering bore 27 extends from the internal bore 26 to the external sealing end shoulder 24.

For introducing jets of air into the water stream as it flows through the inlet bore 25, the central bore 26 and the outlet bore 27, a plurality of air jet ports 28 are provided opening into the sleeve, such as into the central bore 26 as shown in FIG. 2, at a point adjacent the trailing or outlet portion thereof. The external surface of the sleeve 14 is recessed by an annular groove or recess 29 to define an inlet area for the jet ports 28. In order to provide jets of high speed air into the water stream, the air ports 28 taper from a relatively wide opening 30 in the annular groove 29 to relatively small jet ports 31 opening into the central water passage 26 at a point therein adjacent, but not opening into, the tapered outlet bore 27. In the modification shown in the drawings, 12 air jet ports 28 have been shown and utilized. Depending primarily upon the amount of air to be introduced into the stream, the number of such ports may be increased or decreased.

In use, the fitting 10 is secured, for example, to a sillcock 11 or pipe end, and hose 12 is secured to the fitting. It is important of course that the hose either be open at its opposite end or a nozzle be utilized of sufficient size in order to achieve the desired flow through the fitting 10 without creating back pressure. The fitting is most desirably utilized where there is a minimum of back pressure in the hose and the irrigation is accomplished by a slow water flow or flooding method. This allows the water, with the substantial air content induced by the fitting 10, to seep slowly into the ground and thereby achieve a maximum beneficial effect on growing plants.

While certain illustrative embodiments and modifications have been shown in the drawings and described above in considerable detail, it should be understood that there is no intention to limit the invention to the specific forms disclosed. On the contrary, the intention is to cover all modifications, alternative constructions, equivalents and uses falling within the spirit and scope of the invention as expressed in the appended claims.

I claim:

1. An aerator fitting adapted to be mounted between a pressurized water outlet and an irrigation conduit for introducing atmospheric air into a stream of water, comprising:

a sleeve-shaped body member having a passageway therethrough including means at one end adapted for engagement with the outlet and means at the opposite end adapted for engagement with an irrigating conduit;

means defining an internal tapered inlet passageway portion in said sleeve having its larger cross-section adjacent said outlet engaging means;

means defining a tapered outlet passageway portion in said sleeve in juxtaposition with said conduit engaging means and with its larger cross-section adjacent the end of said sleeve;

means defining a central passageway portion intermediate the ends of said sleeve and extending between the narrower ends of said tapered passageways;

and means defining tapered air jet inlet passages extending through said sleeve from an external surface thereof and opening into said central passageway, said air jet passages tapering from a relatively larger cross-section adjacent the external surface of said sleeve to a relatively smaller cross-section at said central passageway, for speeding up air flow through said passages into said central passageway;

whereby when water under pressure flows through said tapered and intermediate sleeve passageways, jets of atmospheric air drawn through said air jet passages squirt into said water to aerate the same, the air introduced thereby being dissolved and entrapped in said water as said aerated water flows through the irrigation conduit to the outlet thereof.

2. An aerator fitting as defined in claim 1 including means defining an external groove in the outer surface of said sleeve intermediate the ends thereof with said tapered air jet passages extending through the portion of said sleeve adjacent said annular groove and opening into said central passageway portion of said sleeve passageway.

3. An aerator fitting as defined in claim 2 wherein said tapered air jet passages are axially inclined in the direction of the flow of water through said fitting.

* * * * *